United States Patent
Scherenberg

[11] 3,876,844
[45] Apr. 8, 1975

[54] STEERING WHEEL FOR MOTOR VEHICLES

[75] Inventor: Hans O. Scherenberg, Stuttgart, Germany

[73] Assignee: Daimler-Benz Aktiengesellschaft, Stuttgart, Germany

[22] Filed: Feb. 16, 1973

[21] Appl. No.: 333,370

[30] Foreign Application Priority Data
Feb. 16, 1972  Germany.......................... 2207149

[52] U.S. Cl. ................. 200/61.57; 200/86; 74/552
[51] Int. Cl. ............................................. H01h 9/00
[58] Field of Search................... 74/552, 558, 558.5; 200/61.57

[56] References Cited
UNITED STATES PATENTS

| | | | |
|---|---|---|---|
| 2,946,869 | 7/1960 | Parks et al. ................... | 74/558.5 X |
| 3,476,897 | 11/1969 | De Vincent...................... | 74/552 X |
| 3,485,974 | 12/1969 | Wolf et al. ....................... | 74/552 X |
| 3,515,825 | 6/1970 | Burton et al..................... | 200/61.57 |
| 3,544,746 | 12/1970 | Wolf et al...................... | 200/61.57 X |

FOREIGN PATENTS OR APPLICATIONS
23,762  12/1921  France............................ 200/61.57

Primary Examiner—Samuel Scott
Assistant Examiner—F. D. Shoemaker
Attorney, Agent, or Firm—Craig & Antonelli

[57] ABSTRACT

A steering wheel for motor vehicles whose steering wheel rim consists of an inner rigid part and of an elastically deformable part surrounding the former in which are arranged contact devices which close an energizing circuit for the actuation of an accessory such as, for example, a signal horn upon application of pressure on the elastically deformable part; the contact devices which consist, for example, of contact bands or contact bars are thereby arranged on the inside of a hose embedded in the elastically deformable part.

12 Claims, 2 Drawing Figures

PATENTED APR 8 1975  3,876,844
FIG. 1
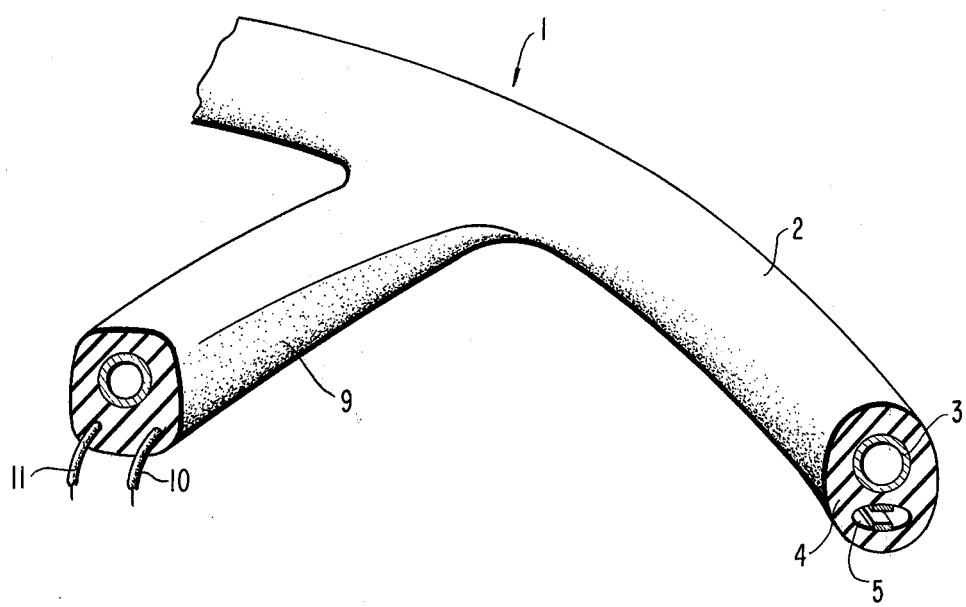
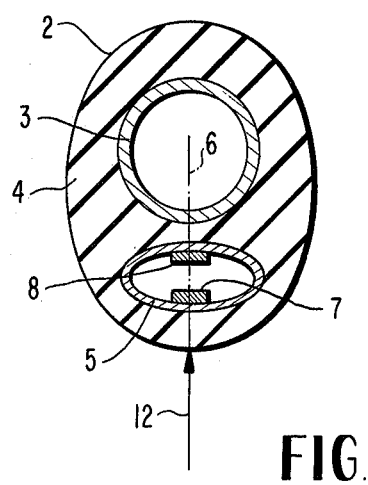
FIG. 2

STEERING WHEEL FOR MOTOR VEHICLES

The present invention relates to a steering wheel for motor vehicles whose steering wheel rim essentially consists of an inner rigid part and of an elastic deformable part surrounding the rigid part, in which are arranged contact devices which, upon pressure on the elastically deformable part close an energizing circuit for the actuation of an accessory, for example, of a signal horn.

In the manufacture of steering wheels of this type, a relatively high structural expenditure is required in order to be able to so arrange the contact devices on the inside of the elastically deformable part, which as a rule consists of a synthetic plastic foamed material, that the individual members of the contact devices, for example, contact bands or contact bars assume an insulating distance from one another which is adapted to be bridged for an intended contact transmission only upon pressure on the elastically deformable part.

The present invention is concerned with the task to provide an arrangement, by means of which the described difficulties cannot arise. The underlying problems are solved according to the present invention in that the contact devices, consisting of contact bands or contact strips, are arranged on the inside of a hose embedded in the elastically deformable portion of the steering wheel rim.

It is achieved by the present invention that the hose together with the contact devices arranged therein only has to be inserted as preassembled part into the form or mold which is required for the manufacture of the elastically deformable part surrounding the inner rigid part of the steering wheel rim. The individual contact members then retain the requisite distance from one another, and it is precluded that material of the elastically deformable part, for example, synthetic resinous foamed material can penetrate into the space between the contact members.

In an advantageous embodiment of the present invention, the hose may have an oval cross section, and the contact devices may be arranged within the area of the minor axis of the oval cross section through the hose. It is possible thereby to use a hose which, on the one hand, retains its shape during the manufacture of the elastically deformable part, for example, during the foaming-in operation and which, on the other, is sufficiently yielding in order to be able to be compressed upon application of pressure on the elastically deformable part for the closing of the contacts.

Accordingly, it is an object of the present invention to provide a steering wheel for motor vehicles which avoids by simple means the aforementioned shortcomings and drawbacks encountered in the prior art.

Another object of the present invention resides in a steering wheel for motor vehicles which considerably reduces the structural expenditures necessary for making the steering wheel.

A further object of the present invention resides in a steering wheel for motor vehicles which assures reliable operation of contact devices arranged on the inside of the steering wheel and adapted to be actuated upon application of a pressure on the steering wheel.

These and further objects, features, and advantages of the present invention will become more apparent from the following description when taken in connection with the accompanying drawing which shows, for purposes of illustration only, one embodiment in accordance with the present invention, and wherein:

FIG. 1 is a partial perspective view of a steering wheel according to the present invention for a motor vehicle with a cross section through the steering wheel rim; and FIG. 2 is a cross section, on an enlarged scale, through the steering wheel rim according to FIG. 1.

Referring now to the drawing wherein like reference numerals are used throughout the two views to designate like parts, according to FIG. 1, with a steering wheel generally designated by reference numeral 1 for motor vehicles, the steering wheel rim 2 consists of an inner rigid part 3 constructed as tubular member or pipe and of a part 4 surrounding the rigid part 3 which is constituted by a foamed synthetic resinous material, for example, made of polyurethane to be elastically deformable.

As can be seen more clearly from FIG. 2, a synthetic plastic hose 5 provided with an oval cross section and made of any suitable synthetic resinous material or the like is arranged in the part 4, whose minor axis 6 is located along a radius through the rigid part 3. Mutually oppositely disposed contact strips 7 and 8 are arranged on the inside of the synthetic plastic hose 5 within the area of the minor axis 6 which are connected in a suitable manner with the walls of the synthetic plastic hose 5. Cables 10 and 11 (FIG. 1) which are located in the hub (not shown) of the steering wheel 1 and are foamed-in into the spoke 9 lead to the contact strips 7 and 8, of which one cable is connected with a current source, such as a battery and the other to a load, for example, to a signal horn.

Upon application of a pressure on the part 4 of the steering wheel rim 2 in the direction of arrow 12 (FIG. 2), the contact strips 7 and 8 are caused to come into contact with one another. After termination of the pressure, the contact strips 7 and 8 again disengage from one another.

While I have shown and described only one embodiment in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

What I claim is:

1. A steering wheel for motor vehicles whose steering wheel rim includes an inner relatively rigid part and an elastically deformable part surrounding the rigid part, and in which contact means are arranged in the elastically deformable part which, upon application of pressure on the elastically deformable part are operable to close an energizing circuit for actuation of an accessory, characterized in that the contact means are arranged on the inside of a hose embedded in the elastically deformable part.

2. A steering wheel according to claim 1, characterized in that the contact means are contact bands secured to the walls of the hose.

3. A steering wheel according to claim 1, characterized in that the contact means are contact bars secured to the walls of the hose.

4. A steering wheel according to claim 1, characterized in that the hose essentially consists of synthetic resinous material.

5. A steering wheel according to claim 1, characterized in that said accessory is a signal horn.

6. A steering wheel according to claim 1, characterized in that the hose has an oval cross section and in that the contact means are arranged within the area of the minor axis of the oval cross section through the hose.

7. A steering wheel according to claim 6, characterized in that said accessory is a signal horn.

8. A steering wheel according to claim 1, wherein said rigid part is a closed tubular member.

9. A steering wheel according to claim 1, wherein said contact means includes individual contact members spaced from one another.

10. A steering wheel according to claim 9, wherein said hose has an outer surface which is closed upon itself such that portions of said elastically deformable parts are prevented from penetrating between said individual contact members.

11. A steering wheel according to claim 10, wherein said hose has an oval cross-section, and said individual contact members are arranged to the inner surface of said hose at the minor axis of the oval cross section through said hose.

12. A steering wheel according to claim 10, wherein said rigid part is tubular and is fixed apart from said hose by said elastically deformable part.

* * * * *